US010963436B2

United States Patent
Armangau et al.

(10) Patent No.: US 10,963,436 B2
(45) Date of Patent: Mar. 30, 2021

(54) DEDUPLICATING DATA AT SUB-BLOCK GRANULARITY

(71) Applicant: EMC IP Holding Company LLC, Hopkinton, MA (US)

(72) Inventors: Philippe Armangau, Acton, MA (US); Sorin Faibish, Newton, MA (US); Istvan Gonczi, Berkley, MA (US); Ivan Bassov, Brookline, MA (US); Vamsi K. Vankamamidi, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/176,729

(22) Filed: Oct. 31, 2018

(65) Prior Publication Data

US 2020/0133928 A1   Apr. 30, 2020

(51) Int. Cl.
*G06F 16/215*   (2019.01)
*G06F 3/06*     (2006.01)
*G06F 16/907*   (2019.01)

(52) U.S. Cl.
CPC .......... *G06F 16/215* (2019.01); *G06F 3/0608* (2013.01); *G06F 3/0641* (2013.01); *G06F 3/0673* (2013.01); *G06F 16/907* (2019.01)

(58) Field of Classification Search
None
See application file for complete search history.

(56) References Cited

U.S. PATENT DOCUMENTS

| | | | | |
|---|---|---|---|---|
| 5,153,879 A | * | 10/1992 | Tanaka | G06F 3/0601 369/59.25 |
| 5,235,623 A | * | 8/1993 | Sugiyama | H03M 7/3053 341/67 |
| 5,271,071 A | * | 12/1993 | Waite | H04N 19/98 358/1.9 |
| 5,990,810 A | * | 11/1999 | Williams | G06F 3/0641 707/E17.01 |
| 7,831,793 B2 | * | 11/2010 | Chakravarty | G06F 11/1451 711/165 |
| 8,108,353 B2 | * | 1/2012 | Balachandran | H03M 7/3084 707/664 |
| 8,156,306 B1 | * | 4/2012 | Raizen | G06F 3/0608 711/202 |

(Continued)

OTHER PUBLICATIONS

Armangau, Philippe, et al.; "Inline Deduplication of Compressed Data," U.S. Appl. No. 14/980,944, filed Dec. 28, 2015.

(Continued)

*Primary Examiner* — Mariela Reyes
*Assistant Examiner* — Edward Jacobs
(74) *Attorney, Agent, or Firm* — BainwoodHuang

(57) ABSTRACT

A technique for performing data deduplication operates at sub-block granularity by searching a deduplication database for a match between a candidate sub-block of a candidate block and a target sub-block of a previously-stored target block. When a match is found, the technique identifies a duplicate range shared between the candidate block and the target block and effects persistent storage of the duplicate range by configuring mapping metadata of the candidate block so that it points to the duplicate range in the target block.

20 Claims, 9 Drawing Sheets

(56) References Cited

U.S. PATENT DOCUMENTS

| | | | |
|---|---|---|---|
| 8,190,850 B1* | 5/2012 | Davenport | G06F 16/10 711/202 |
| 8,442,956 B2* | 5/2013 | Tofano | G06F 16/24556 707/692 |
| 8,539,148 B1* | 9/2013 | Chen | G06F 3/061 711/112 |
| 8,589,640 B2 | 11/2013 | Colgrove et al. | |
| 8,631,052 B1* | 1/2014 | Shilane | G06F 16/1748 707/825 |
| 8,667,032 B1* | 3/2014 | Shilane | G06F 11/3034 707/825 |
| 8,799,601 B1* | 8/2014 | Chen | G06F 3/0641 711/162 |
| 9,026,740 B1* | 5/2015 | Shilane | G06F 11/1453 711/137 |
| 9,116,902 B1* | 8/2015 | Shilane | G06F 16/1744 |
| 9,430,156 B1* | 8/2016 | Shilane | G06F 3/0685 |
| 9,460,102 B1* | 10/2016 | Bono | G06F 3/0641 |
| 9,569,455 B1* | 2/2017 | Bono | G06F 3/0641 |
| 9,671,974 B2* | 6/2017 | Kaczmarczyk | G06F 16/1448 |
| 9,767,154 B1* | 9/2017 | Wallace | H03M 7/3091 |
| 10,037,336 B1 | 7/2018 | Hu et al. | |
| 10,416,900 B2 | 9/2019 | Khan et al. | |
| 10,614,037 B2 | 4/2020 | Dain et al. | |
| 2006/0020474 A1* | 1/2006 | Stewart | G10L 19/167 704/500 |
| 2009/0013129 A1* | 1/2009 | Bondurant | G06F 3/0608 711/115 |
| 2009/0171888 A1* | 7/2009 | Anglin | G06F 16/113 |
| 2010/0205163 A1* | 8/2010 | Eshghi | G06F 11/1453 707/698 |
| 2010/0223441 A1* | 9/2010 | Lillibridge | G06F 3/0631 711/165 |
| 2011/0099351 A1* | 4/2011 | Condict | G06F 3/0608 711/216 |
| 2011/0238635 A1* | 9/2011 | Leppard | G06F 16/1752 707/693 |
| 2011/0267207 A1* | 11/2011 | McCanne | H03M 7/30 341/59 |
| 2012/0036113 A1* | 2/2012 | Lillibridge | G06F 3/0641 707/694 |
| 2012/0131025 A1* | 5/2012 | Cheung | G06F 16/1752 707/755 |
| 2012/0159098 A1* | 6/2012 | Cheung | G06F 12/0261 711/162 |
| 2012/0204024 A1* | 8/2012 | Augenstein | G06F 21/602 713/150 |
| 2012/0233135 A1* | 9/2012 | Tofano | G06F 16/24556 707/692 |
| 2013/0018855 A1* | 1/2013 | Eshghi | G06F 11/1453 707/692 |
| 2013/0036277 A1* | 2/2013 | Szczepkowski | G06F 12/0811 711/159 |
| 2013/0042083 A1* | 2/2013 | Mutalik | G06F 16/185 711/162 |
| 2014/0115260 A1 | 4/2014 | Maybee et al. | |
| 2015/0227602 A1* | 8/2015 | Ramu | G06F 16/2365 707/634 |
| 2016/0188622 A1* | 6/2016 | Sharangpani | G06F 16/2246 707/693 |
| 2016/0232195 A1* | 8/2016 | Davis | G06F 16/2365 |
| 2018/0039442 A1 | 2/2018 | Shadrin | |
| 2018/0285014 A1* | 10/2018 | Li | G06F 12/00 |

OTHER PUBLICATIONS

Swift, Jeremy; "Deduplication and Compression of Data Segments in a Data Storage System," U.S. Appl. No. 15/976,371, filed May 10, 2018.

Armangau, Philippe, et al.; "Speeding De-Duplication Using a Temporal Digest Cache," U.S. Appl. No. 15/668,388, filed Aug. 3, 2017.

Armangau, Philippe, et al.; "Speeding Deduplication Using a Most Wanted Digest Cache," U.S. Appl. No. 15/799,117, filed Oct. 31, 2017.

* cited by examiner

DEDUPLICATING DATA AT SUB-BLOCK GRANULARITY

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some storage systems support data "deduplication." A common deduplication scheme involves replacing redundant copies of a data block with pointers to a single retained copy. Data deduplication may operate in the background, after redundant data blocks have been stored, and/or operate inline with storage requests. Inline deduplication matches newly arriving data blocks with previously stored data blocks and configures pointers accordingly, thus avoiding initial storage of redundant copies.

A common deduplication scheme involves computing digests of data blocks and storing the digests in a database. Each digest is computed as a hash of a data block's contents and identifies the data block with a high level of uniqueness, even though the digest is typically much smaller than the data block itself. Digests thus enable block matching to proceed quickly and efficiently, without having to compare blocks directly. For each digest, the database stores a pointer that leads to a stored version of the respective data block. To perform deduplication on a particular candidate block, a storage system computes a digest of the candidate block and searches the database for an entry that matches the computed digest. If a match is found, the storage system arranges metadata of the candidate block to point to the data block that the database has associated with the matching digest. In this manner, a duplicate copy of the data block is avoided.

SUMMARY

Unfortunately, conventional deduplication schemes fail to detect redundant data when blocks are similar but not identical. For example, a data storage system might store multiple copies of a given block, which are nearly identical except for a timestamp or label, which is unique to each copy. Owing to the randomizing nature of the hash function, digests computed from the slightly different copies of the data block differ widely from one another, such that deduplication is unable to detect the redundant content. Many opportunities to improve storage efficiency are therefore missed.

In contrast with the prior approach, an improved technique for performing data deduplication operates at sub-block granularity by searching a deduplication database for a match between a candidate sub-block of a candidate block and a target sub-block of a previously-stored target block. When a match is found, the technique identifies a duplicate range shared between the candidate block and the target block and effects persistent storage of the duplicate range by configuring mapping metadata of the candidate block so that it points to the duplicate range in the target block.

Advantageously, the improved technique avoids redundant storage of identical portions of data blocks, even when the data blocks as a whole are different. Storage efficiency is thereby improved.

Certain embodiments are directed to a method of performing data deduplication. The method includes receiving, by a data storage system, an I/O (Input/Output) request that specifies a write of a set of data to the data storage system, the data storage system defining a candidate block from at least a portion of the set of data, the candidate block including multiple uniformly-sized sub-blocks, the sub-blocks including a candidate sub-block. The method further includes searching a deduplication database for a target sub-block that matches the candidate sub-block. In response to finding a matching entry in the deduplication database for the target sub-block, the method further includes (i) accessing a previously-stored target block that contains the target sub-block, (ii) identifying a shared range between the candidate block and the target block for which a duplicate range $R_{DUP}$ of the candidate block matches a target range $R_{TARG}$ of the target block, and (iii) effecting persistent storage of the duplicate range $R_{DUP}$ of the candidate block by configuring mapping metadata of the candidate block to reference the target range $R_{TARG}$ of the target block.

Other embodiments are directed to a data storage system constructed and arranged to perform a method of performing data deduplication, such as the method described above. Still other embodiments are directed to a computer program product. The computer program product stores instructions which, when executed by control circuitry of a data storage system, cause the data storage system to perform a method of performing data deduplication, such as the method described above.

In some examples, the technique further includes identifying a unique range $R_{UQ}$ of the candidate block that does not match any range of the target block and persistently storing the unique range $R_{UQ}$ of the candidate block in a storage extent.

In some examples, identifying the duplicate range $R_{DUP}$ of the candidate block includes locating a boundary between the duplicate range $R_{DUP}$ and the unique range $R_{UQ}$ by comparing the candidate block with the target block in increments smaller than a sub-block.

In some examples, configuring the mapping metadata to point to the target range $R_{TARG}$ of the target block includes specifying, in the mapping metadata, an offset and length of the target range $R_{TARG}$ in the target block.

In some examples, searching the deduplication database includes computing a digest of the candidate sub-block and searching the deduplication database for an entry that corresponds to the computed digest.

In some examples, when computing the digest of the candidate block, a digest is computed for each of the sub-blocks of the candidate block and the deduplication database is searched for respective entries that correspond to the computed digest of one or more of the sub-blocks.

In some examples, the sub-blocks of the candidate block consist of first through last contiguous sub-blocks and the technique further includes creating a new entry in the deduplication database for the first sub-block. The new entry is indexed based on the digest of the first sub-block and includes reference to a location of the candidate block in the data storage system. According to this example, the technique further includes creating a new entry in the deduplication database for the last sub-block. The new entry for the last sub-block is indexed based on the digest of the last sub-block and includes a reference to a location of the candidate block in the data storage system.

In some examples, the technique further includes receiving, by the data storage system, additional sets of data, and defining additional candidate blocks from the additional sets of data. For each of the additional candidate blocks, the technique includes (i) creating a new entry in the deduplication database for a first sub-block of the respective candidate block, (ii) creating a new entry in the deduplication database for a last sub-block of the respective candidate block, and (iii) creating no new entries for any sub-blocks of the respective candidate block between the first sub-block and the last sub-block.

According to some examples, the matching entry in the deduplication database further specifies a sub-block position. The sub-block position indicates a position of the target sub-block within the target block. In such examples, locating the boundary between the duplicate range $R_{DUP}$ and the unique range $R_{UQ}$ includes applying the sub-block position in selecting a direction in which to proceed when comparing the candidate block with the target block.

According to some examples, the technique further includes identifying a second unique range $R_{UQ2}$ of the candidate block that does not match any range of the target block and that is discontiguous with the unique range $R_{UQ}$ within the candidate block, and persistently storing the second unique range $R_{UQ2}$ along with the unique range $R_{UQ}$ in the storage extent.

According to some variants, the technique further includes configuring mapping metadata that identifies a boundary in the storage extent between the unique range $R_{UQ}$ and the second unique range $R_{UQ2}$.

According to some examples, the technique further includes identifying a second duplicate range $R_{DUP2}$ of the candidate block, the second duplicate range $R_{DUP2}$ matching a sub-block of a second target block, and effecting persistent storage of the second duplicate range $R_{DUP2}$ by configuring mapping metadata to point to the sub-block of the second target block.

According to some examples, the technique further includes identifying a second duplicate range $R_{DUP2}$ of the candidate block, the second duplicate range $R_{DUP2}$ matching a second sub-block of the target block, and effecting persistent storage of the second duplicate range $R_{DUP2}$ by configuring mapping metadata to point to the second sub-block of the target block.

According to some examples, the technique further includes providing a first block virtualization structure (BVS) for the candidate block, the first BVS including a pointer to a location where the unique range $R_{UQ}$ of the candidate block is persistently stored, and providing a second BVS for the target block, the second BVS including a pointer to a location where the target range $R_{TARG}$ of the target block is persistently stored.

According to some examples, the technique further includes storing, in a metadata block that contains the first BVS, the mapping metadata that points to the range $R_{TARG}$ of the target block.

According to some examples, the technique further includes providing a leaf indirect block (IB) that includes a block pointer to the first BVS, and storing, in the leaf IB, the mapping metadata that points to the range $R_{TARG}$ of the target block.

In some examples, each of the sub-blocks has a size of one sector (512 Bytes).

In some examples, computing the digest of the candidate sub-block provides the digest as a hash value having fewer than 128 bits and, when comparing the candidate block with the target block, the technique further includes confirming that the matching entry is not a hash collision.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for performing data deduplication operates at sub-block granularity by searching a deduplication database for a match between a candidate sub-block of a candidate block and a target sub-block of a previously-stored target block. When a match is found, the technique identifies a duplicate range shared between the candidate block and the target block and effects persistent storage of the duplicate range by configuring mapping metadata of the candidate block so that it points to the duplicate range in the target block.

Figure 1:
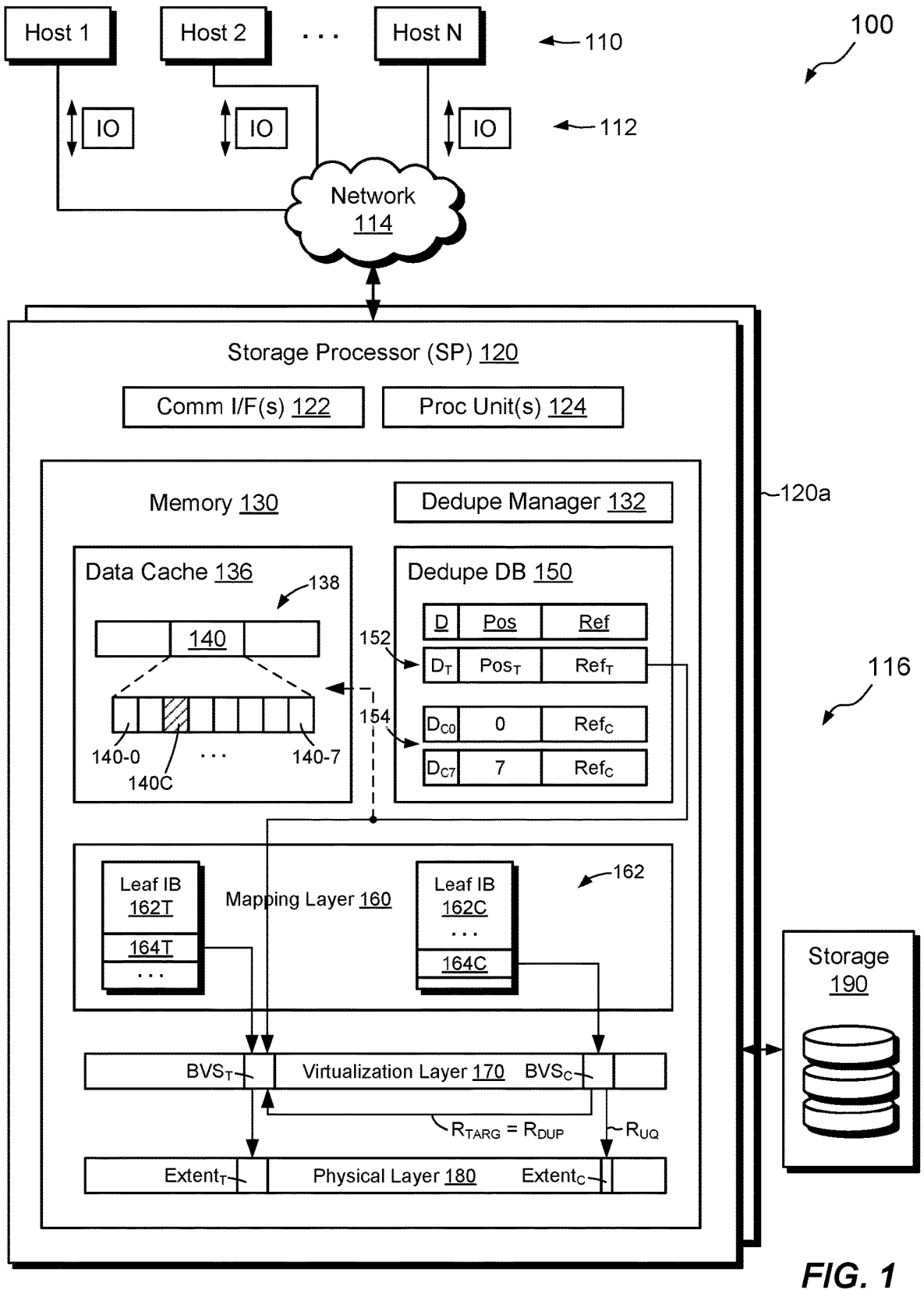
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes a storage processor, or "SP," 120 and storage 190, such as magnetic disk drives, electronic flash drives, and/or the like. The data storage system 116 may include multiple SPs (e.g., a second SP 120a). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 190.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs. The memory 130 includes both volatile memory, e.g., Random Access Memory (RAM), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a data cache 136, a deduplication ("dedupe") manager 132, a deduplication database 150, a mapping layer 160, a virtualization layer 170, and a physical layer 180. The dedupe manager 132 is configured to manage deduplication activities. The data cache 136 may be realized in volatile memory (e.g., RAM) and is configured to store temporarily incoming data arriving from hosts 110. The data cache 136 may also store recently-written and/or read data blocks, to support deduplication. In an example, the data cache 136 defines incoming data 138 from hosts 110 in the form of blocks (such as block 140), where each block is composed of a sequence of sub-blocks (e.g., sub-blocks 140-0 through 140-7). As is known, a "block" is a unit of storage in a data storage system, which generally corresponds to the smallest unit of storage space that can be allocated. Block sizes vary from one storage system to the next, with typical sizes being 4 kB (kilobytes) or 8 kB, for example. In the particular arrangement shown, there are eight sub-blocks per block, and the sub-blocks are contiguous and uniform in size. For example, if the block size is 4 kB, each sub-block would be 512 B, which corresponds to one sector.

The dedupe database 150 is configured to store digests of sub-blocks along with associated information. For example, the dedupe database 150 stores, for each of multiple sub-blocks, a digest "D" of that sub-block and a reference ("Ref") to a location, in the data storage system 116, of a data block that contained the respective sub-block when the database entry was made. The SP 120 computes each digest as a hash of the respective sub-block's contents. Thus, different sub-blocks produce different digests, with rare hash collisions being possible. The reference Ref may take various forms. For example, Ref may point to a memory location in the data cache 136 where the data block is temporarily being held. Alternatively, Ref may point to metadata (e.g., a block virtualization structure) that maps to the data block, such that a persisted version of the data block may be obtained by following the reference to the pointed-to metadata. In some examples, the reference points directly to the data block, e.g., in the physical layer 180. An entry in the dedupe database 150 may further include a sub-block position, "Pos," which indicates a position of the sub-block for that entry in the referenced data block. For example, if the sub-block for a database entry was the first sub-block in the data block that contained it, then the position Pos might be 0. If the sub-block was the last sub-block in the data block, then the position might be 7. In some examples, entries in the dedupe database 150 are created only for first and last sub-blocks of their parent data blocks, such that there are only two possibilities and Pos may be represented with a single bit. In some examples, sub-block position may be tracked using a separate bitmap. The bitmap may be arranged by sub-block and may provide a single bit for each sub-block, to indicate whether the respective sub-block is in the first position or in the last position.

Preferably, the dedupe database 150 operates as a memory-resident cache. The cache may employ an LRU (least-recently used) eviction policy. In some examples, when evicting an entry from the dedupe database 150, the SP 120 also evicts the data block referenced by that entry in the data cache 136. In some cases, the dedupe database 150 is backed by persistent storage, with portions read into volatile memory as needed for fast access.

The mapping layer 160 includes metadata for mapping blocks of data objects, such as LUNs (Logical UNits), file systems, virtual machine disks, and/or the like, which may be managed by a separate namespace layer (not shown). The mapping layer 160 maps each data object to a corresponding set of block virtualization structures ("BVS's") in the virtualization layer 170. In some examples, one BVS is provided for each addressable data block in the storage system. The mapping layer 160 includes indirect blocks ("IB's") 162. Each IB 162 is a block that contains an array of block pointers, such as 1024 block pointers. In an example, IB's 162 are arranged in a tree, or in multiple trees, in which block pointers in parent IB's point to child IB's and thus multiply the total number of BVS's (and therefore data blocks) that can be addressed.

In the virtualization layer 170, the BVS's enable the data storage system 116 to deduplicate physical data blocks and to relocate physical data blocks without having to update block pointers in the mapping layer 160. Block pointer updates would be a very burdensome task, given that block pointers tend to be much more numerous and widely dispersed than are BVS's.

The physical layer 180 manages the physical data blocks of the data storage system 116. For example, the physical layer 180 is denominated in data blocks of uniform size, such as 4 kB, 8 kB, or the like. Each data block is uniquely addressable. The physical layer 180 is configured to store host data as storage extents in the data blocks. The extents may hold compressed data or uncompressed data. Some extents may be smaller than a block, e.g., if the data are compressed and/or if only a portion of a block's data are uniquely stored. One should appreciate that the physical layer 180 is itself a logical structure and that the bits of data are actually stored in devices of the storage 190. The data storage system 116 may include additional layers, which are not shown, such as a RAID (Redundant Array of Independent (or Inexpensive) Disks) layer, additional mapping layers, and the like. The depicted arrangement is intended merely to be illustrative.

In example operation, the hosts 110 issue I/O requests 112 to the data storage system 116. The SP 120 receives the I/O requests 112 at the communication interfaces 122 and initiates further processing. For example, the SP 120 receives sets of incoming data 138 being written by hosts 110 and renders the data in block-sized increments of memory, referred to herein simply as "blocks." The data as received from the hosts is not necessarily block-denominated and may arrive in I/O's of any size. Nevertheless, the data cache 136 may store the arriving data as blocks, which the data cache 136 may realize in buffer caches, for example. The size of the buffer caches is preferably configured to match the block size of the data storage system 116.

To support sub-block data deduplication, the SP 120 defines multiple sub-blocks for the defined blocks. For example, the SP 120 renders block 140 as sub-blocks 140-0 through 140-7, which are contiguous and uniformly sized. We have recognized that a sub-block size of 512 B (one sector) is particularly well-suited for sub-block deduplication, as many host applications use the sector as a standard size for performing writes. Although host applications may shift data when writing to the data storage system 116, such shifts tend to appear in full-sector increments. Performing deduplication at per-sector granularity thus catches many shifted sectors that conventional, block-based deduplication would miss. Setting the sub-block size to something different from a sector is not excluded by the invention, however.

With the sub-blocks 140-0 through 140-7 defined, a deduplication attempt begins by attempting to match one or more the sub-blocks to an entry in the dedupe database 150. For example, the dedupe manager 132 receives a candidate sub-block 140C of the candidate block 140 and generates a digest of the candidate sub-block 140C, e.g., by applying a hash function to the contents of sub-block 140C. The dedupe manager 132 then searches the dedupe database 150 for a digest D that matches the computed digest of sub-block 140C. In a non-limiting example, the dedupe database 150 is constructed as a key-value store, where the digest D forms the key and the reference Ref and position Pos form the value. In such cases, searching for a matching entry in the dedupe database 150 merely entails looking up the value that corresponds to the digest which is applied as the key. If no match is found, the dedupe manager 132 may try a different sub-block of candidate block 140. If no match is found after attempting all sub-blocks 140-0 through 140-7, then the deduplication attempt fails for the candidate block 140. The SP 120 may then allocate a new storage extent from the physical layer 180 and store the contents of the candidate block 140 in the newly allocated extent.

If the dedupe manager 132 succeeds, however, in finding a matching entry 152 to the candidate sub-block 140C, then deduplication proceeds. In an example, the matching entry 152 is the entry in the dedupe database 150 for which the digest $D_T$ matches the computed digest of the candidate sub-block 140C. The digest $D_T$ itself was computed for an earlier processed sub-block, which we refer to as a "target sub-block," and was part of an earlier-processed data block, which we refer to as a "target block."

The dedupe manager 132 then follows the reference $Ref_T$ in the matching entry to obtain the target block, which may still reside in the data cache 136 or which may be fetched from storage 190 if it does not. Depending on implementation, the deduplication attempt may fail if there is a cache miss, as fetching the target block from disk may be too time-consuming to be warranted.

Assuming the target block is obtained, the dedupe manager 132 may proceed by confirming the match. For example, the dedupe manager 132 compares the candidate sub-block 140C with the target sub-block as read from the target block and tests whether the two are the same, e.g., by performing a data comparison. Note that the matching entry 152 indicates, via $POS_T$, the position of the target sub-block in the target block. Thus, the comparison may proceed without having to scan the entire target block.

Assuming the match is confirmed, the dedupe manager 132 may identify the full extent of the match. For example, a match to the target sub-block may be part of a larger match between the candidate block 140 and the target block. Given the position, $Pos_T$, of the target sub-block in the target block, the dedupe manager 132 selects a direction in which to search for an extended match. For instance, if the target sub-block was the first block in the target block, then the search should proceed in the forward direction. But if the target sub-block was the last block in the target block, the search should proceed in the reverse direction. The dedupe manager 132 proceeds in the indicated direction, comparing bytes of the candidate block 140 with corresponding bytes of the target block, until an end of the candidate block 140 is reached or until the bytes of the two blocks no longer match. The dedupe manager 132 then identifies a boundary between a duplicate range of the candidate block, $R_{DUP}$, which is shared with a target range $R_{TARG}$ of the target block, and a unique range of the candidate block $R_{UQ}$, which is unique to the candidate block 140. Some block comparisons may yield two unique ranges, one before the duplicate range $R_{DUP}$ and one after.

Next, the dedupe manager 132 effects persistent storage of the candidate block 140, in a manner that efficiently accounts for both the duplicate range $R_{DUP}$ and the unique range $R_{UQ}$ (or unique ranges). In the example shown, the data storage system 116 has already stored the target block, along with metadata to support it. For example, SP 120 already configured a block pointer 164T in a leaf IB 162T in the mapping layer 160. The block pointer 164T is already configured to point to $BVS_T$ in the virtualization layer 170. $BVS_T$ in turn points to $Extent_T$, which stores the target block in the physical layer 180. Now, to support storage of the candidate block 140, the mapping layer 160 configures a block pointer 164C in leaf IB 162C. The block pointer 164C points to $BVS_C$, which is made to point to two different locations. The first location is the address of $Extent_C$, which is designated for storing the unique range (or ranges), $R_{UQ}$, of the candidate block. The second location is the address of $BVS_T$, i.e., the BVS that points to the target block and contains the duplicate range, $R_{DUP}$. When pointing to $BVS_T$, the metadata in $BVS_C$ may specify the range $R_{TARG}$ of the target block that contains the shared data, such as by offset and length. The SP 120 may then store the unique range $R_{UQ}$ in $Extent_C$. The stored data may be compressed, if desired.

The described operations thus effect storage of the candidate block 140 while consuming only the amount of storage space required to support the unique range, $R_{UQ}$, which may be as small as a single sector, or smaller if compressed. Some additional metadata may be needed, but the additional metadata is small compared with the amount of storage space conserved. In a conventional, block-based deduplication scheme, the unique range $R_{UQ}$ would have precluded any match to a previous block, so the entire block would have to have been stored, which would have been up to eight times the amount of data that is stored in the current example.

One significant feature of the described technique is that it combines digest-based lookups of sub-blocks with data comparisons of data. In some circumstances, this arrangement allows data to be deduplicated at levels even smaller than the size of a sub-block. For example, when comparing the candidate block 140 with the target block, the dedupe manager 132 may operate with arbitrarily high precision. Thus, the dedupe manager 132 can identify boundaries between duplicate ranges and unique ranges with precision as high as a single byte.

Because the described technique uses data comparisons as part of its processing, the act of confirming that there are no hash collisions is a simple matter, as the target block and candidate block are already being compared. Some embodiments leverage this feature by using relatively small digests in the dedupe database 150, such as digests having fewer than 128 bits. Although long digests can reduce the risk of hash collisions to nearly zero, they are complex to compute and can place high burdens on processor cores. As the disclosed technique compares the blocks as part of its regular processing, the technique is tolerant to hash collisions. Should a hash collision (false positive match) occur, the collision will be detected by data comparison and treated as a non-match. In such cases, the dedupe manager 132 can simply try again or move on to the next sub-block of the candidate block, attempting to match that one.

Also, one should appreciate that sub-block deduplication is also capable of matching entire blocks. For instance, if a data comparison of a candidate block to a target block results in a duplicate range $R_{DUP}$ the size of the entire block, with a unique range $R_{UQ}$ of zero size, then the entire block is matched and no unique range needs to be stored.

One might observe that sub-block duplication generally requires a greater number of digest lookups than does block-based deduplication. However, the use of smaller digests can help to offset the increased number of lookups. Also, implementations may limit the cost of lookups where no match is found by using Bloom filters, for example.

Although data comparisons are the general rule, it can be avoided in some circumstances. For instance, if the candidate sub-block is in the first position of the candidate block (like sub-block 140-0), and the position indicator $Pos_T$ of the matching entry 152 indicates the last position in the target block, then the match cannot be extended as there is no possibility of there being additional shared content. The match would thus be limited to the matching sub-block, and a data comparison is avoided.

The dedupe manager 132 may also play a role in loading the dedupe database 150 with new content. For instance, as the data cache 136 receives new host data and defines new blocks, the dedupe manager 132 may access those blocks and create new database entries for one or more of their sub-blocks. Creating new entries for all sub-blocks of each newly defined block is certainly an option, but we have recognized that it is generally sufficient to create entries for only the first and the last sub-blocks, e.g., 140-0 and 140-7. In the example shown, the dedupe manager 132 has created new database entries for sub-blocks 140-0 and 140-7. Each entry includes a digest hash of the respective sub-block ($D_{C0}$ or $D_{C7}$), a position (0 or 7) of the respective sub-block in the candidate block 140, and a reference $Ref_C$ to the candidate block 140, which may be a pointer to the buffer cache that stores the candidate block 140 in the data cache 136.

A rationale behind limiting new database entries to first and last sub-blocks is that data shifts (by sector increments) are common, but data inserts are expected to be relatively rare. Recording entries for the first and last sub-blocks ensures that shifted data will produce at least one sub-block match. In some cases, new sub-block entries are avoided for sub-blocks that are already recorded in entries of the dedupe database 150.

Figure 2A:
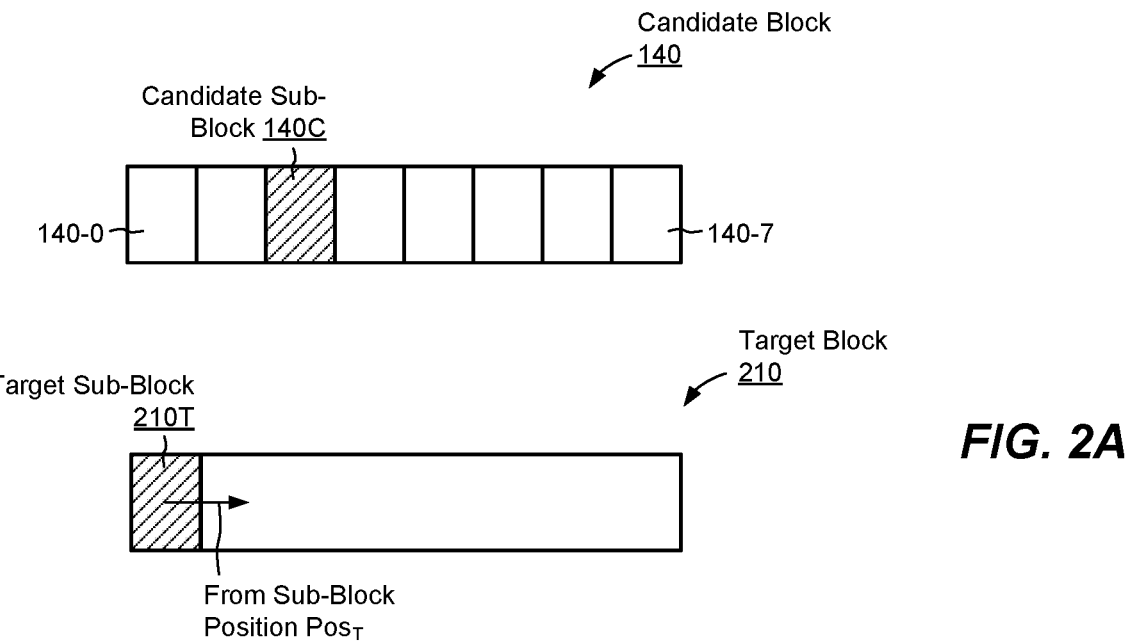
FIGS. 2A and 2B are diagrams that show an example sequence for identifying a duplicate range and a unique range of a candidate block when a candidate sub-block has matched to a target sub-block that occupies a first position of a target block.
Figure 2B:
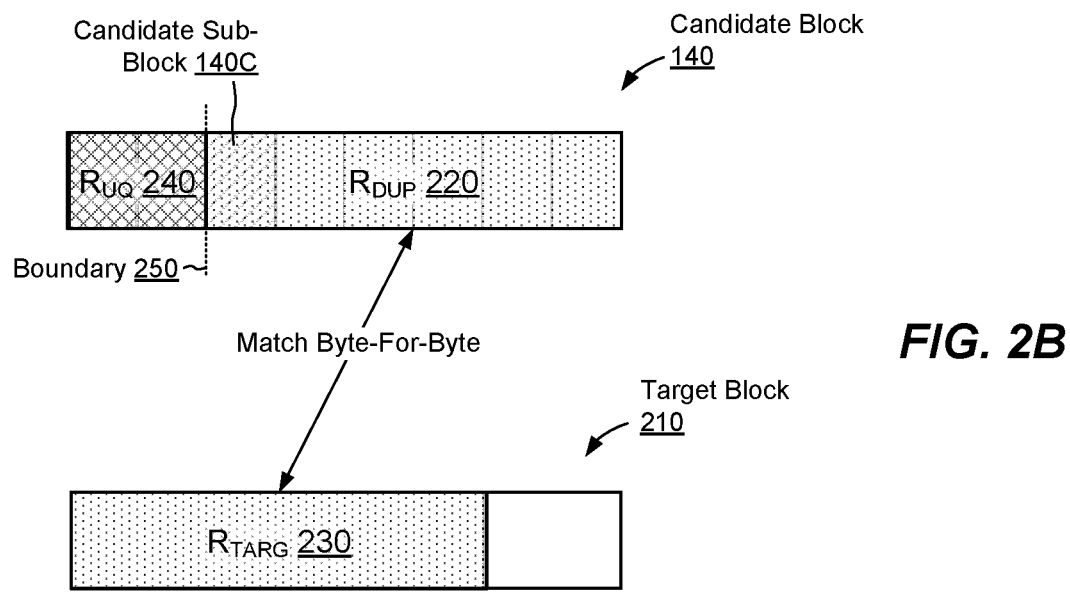

FIGS. 2A and 2B show an example sequence for deduplicating a portion of candidate block 140 when candidate sub-block 140C has been matched to a target sub-block 210T in a first position of a target block 210. As shown in FIG. 2A, the value of $Pos_T$ in the matching entry 152 has identified the target sub-block 210T as being in the first position of the target block 210, which indicates a forward search direction through the candidate block 140. The dedupe manager 132 proceeds to search in the forward direction through the candidate block, starting with the candidate sub-block 140C (or the forward end of it, e.g., if a hash collision has been ruled out). As the dedupe manager 132 advances through the candidate block 140, it advances correspondingly through the target block 210, comparing data of the candidate block 140 with data of the target block 210 at a level of granularity smaller than the size of a sub-block. For instance, comparisons may proceed in 16-byte chunks, in 8-byte chunks, in 1-byte chunks, or in any-sized chunks are best suited to the implementation.

At some point, the dedupe manager 132 either detects a mismatch or reaches the forward end of the candidate block 140. In this example, no mismatch is detected and, as shown in FIG. 2B, the dedupe manager 132 identifies a duplicate range $R_{DUP}$ 220 in the candidate block 140 and a corresponding target range $R_{TARG}$ 230 in the target block 210. These ranges match byte-for-byte and are exact duplicates of each other. The dedupe manager 132 also identifies a unique range, $R_{UQ}$ 240, of the candidate block, which does not correspond to any content in the target block 210. A boundary 250 may be identified between the duplicate range $R_{DUP}$ 220 and the unique range $R_{UQ}$ 240. In this case, the boundary 250 aligns with a sub-block boundary, i.e., between sub-blocks 140-1 and 140-2. The dedupe manager 132 then proceeds as already described, by arranging mapping metadata to effect storage of the duplicate range $R_{DUP}$ (by reference to the range $R_{TARG}$ in the target block) and by directing storage of the unique range $R_{UQ}$ in a storage extent in the physical layer 180. This example thus avoids redundant storage of $R_{DUP}$ and saves three quarters of a block.

Figure 3A:
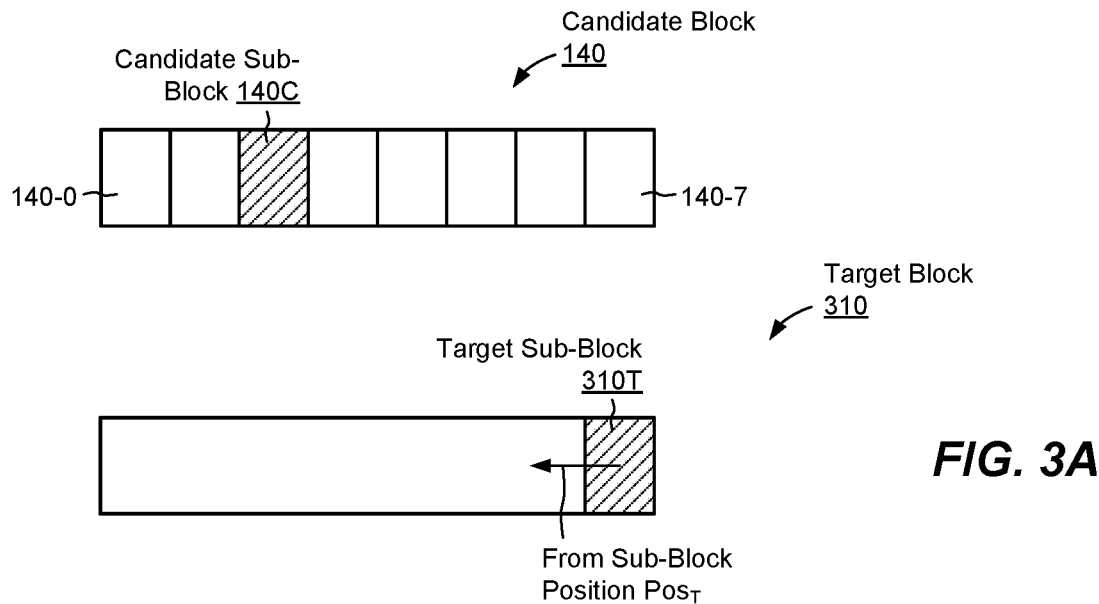
FIGS. 3A and 3B are diagrams that show an example sequence for identifying a duplicate range and a unique range of a candidate block when a candidate sub-block has matched to a target sub-block that occupies a last position of a target block.
Figure 3B:
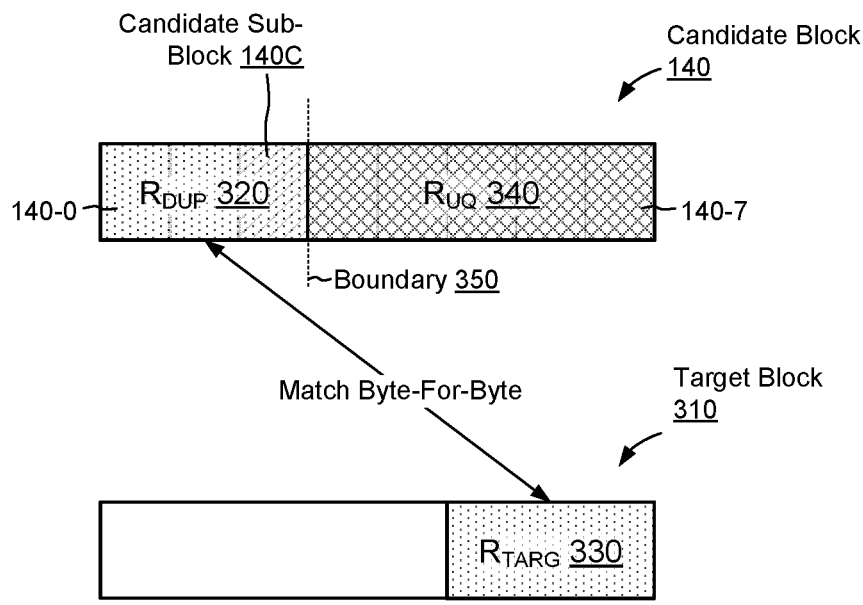

FIGS. 3A and 3B show an example sequence for deduplicating a portion of candidate block 140 when candidate sub-block 140C has been matched to a target sub-block 310T in a last position of a target block 310. As shown in FIG. 3A, the value of $Pos_T$ in the matching entry 152 has identified the target sub-block 310T as being in the last position of the target block 310, which indicates a reverse search direction through the candidate block 140. The dedupe manager 132 proceeds to search in the reverse direction through the candidate block, starting with the candidate sub-block 140C (or the back end of it). As the dedupe manager 132 retracts through the candidate block 140, it retracts correspondingly through the target block 310, comparing data of the candidate block 140 with data of the target block 310 at fine granularity. In this example, no mismatch is detected and, as shown in FIG. 3B, the dedupe manager 132 identifies a duplicate range $R_{DUP}$ 320 in the candidate block 140 and a corresponding target range $R_{TARG}$ 330 in the target block 310. The dedupe manager 132 also identifies a unique range, $R_{UQ}$ 340, of the candidate block 140, which does not correspond to any content in the target block 310. A boundary 350 may also be identified between the duplicate range $R_{DUP}$ 320 and the unique range $R_{UQ}$ 340. In this case, the boundary 350 aligns with a sub-block boundary, i.e., between sub-blocks 140-2 and 140-3. The process then proceeds as described above, by arranging mapping metadata to effect storage of the duplicate range $R_{DUP}$ and by directing storage of the unique range $R_{UQ}$ in the physical layer 180. This example saves three eighths of a block.

Figure 4A:
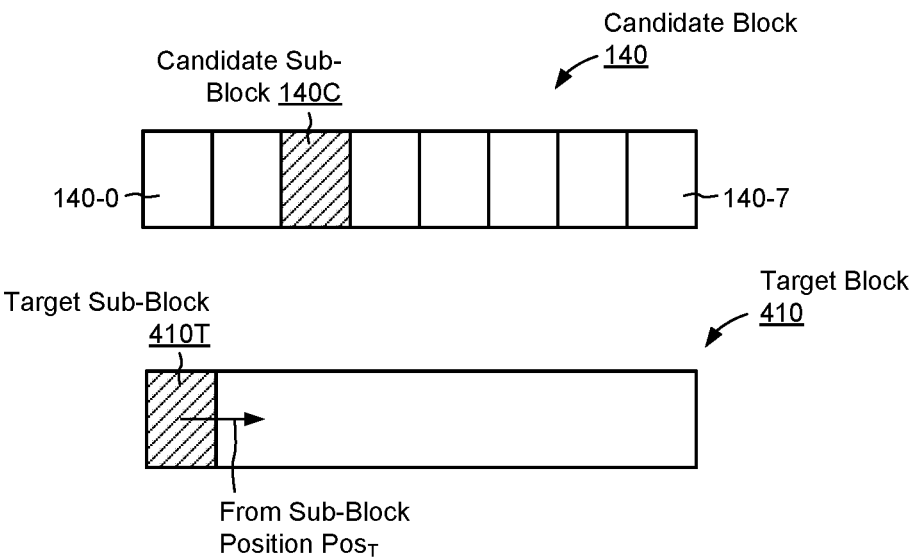
FIGS. 4A-4C are diagrams that show an example sequence for identifying a duplicate range and two discontiguous unique ranges of a candidate block when the duplicate range does not extend all the way to an end of the candidate block.
Figure 4B:
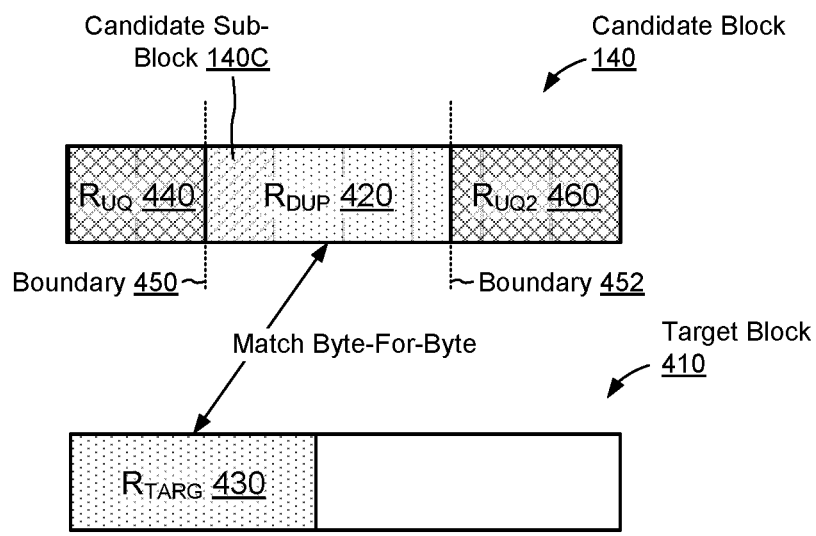

FIGS. 4A and 4B show a slightly more complex example. As in FIG. 2A, the candidate sub-block 140C has been matched to a target sub-block 410T in a first position of a target block 410. But here, the comparison between candidate block 140 and target block 410 has yielded a mismatch. Rather than extending all the way to the end of the candidate block 140, as in FIG. 2B, the duplicate range $R_{DUP}$ 420 ends at boundary 452. Beyond this point, the contents of the two blocks diverge. The boundary 452 does not align with any boundary between sub-blocks but can rather be found at some byte location relative to the fifth sub-block, 140-5.

As shown in FIG. 4B, three distinct ranges are formed: a duplicate range $R_{DUP}$ 420; a first unique range $R_{UQ}$ 440; and a second unique range $R_{UQ2}$ 460. Boundary 450 separates $R_{DUP}$ from $R_{UQ}$, and boundary 452 separates $R_{DUP}$ from $R_{UQ2}$. Range $R_{DUP}$ 420 matches target range $R_{TARG}$ 430 byte-for-byte.

Figure 4C:
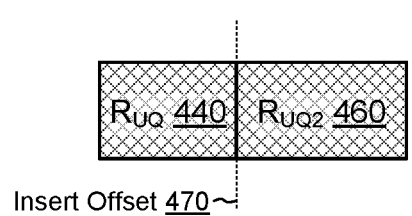

As shown in FIG. 4C, dedupe manager 132 may combine the two unique ranges, $R_{UQ}$ 440 and $R_{UQ2}$ 460, by placing them adjacently, while specifying an insert offset 470 to identify their boundary. The insert offset range 470 is so named as it identifies the location at which the contents of $R_{DUP}$ 420 is to be inserted when the candidate block 140 is reconstructed, e.g., when a later read request arrives. In an example, the SP 120 stores the insert offset 470 in mapping metadata for the candidate block 140. Although not addressed previously, the examples in FIGS. 2A/2B and 3A/3B may also involve specifying an insert offset, which in those examples would indicate whether the duplicate range $R_{DUP}$ is to be inserted before or after the unique range, $R_{UQ}$, when reconstructing the respective candidate blocks.

Figure 5A:
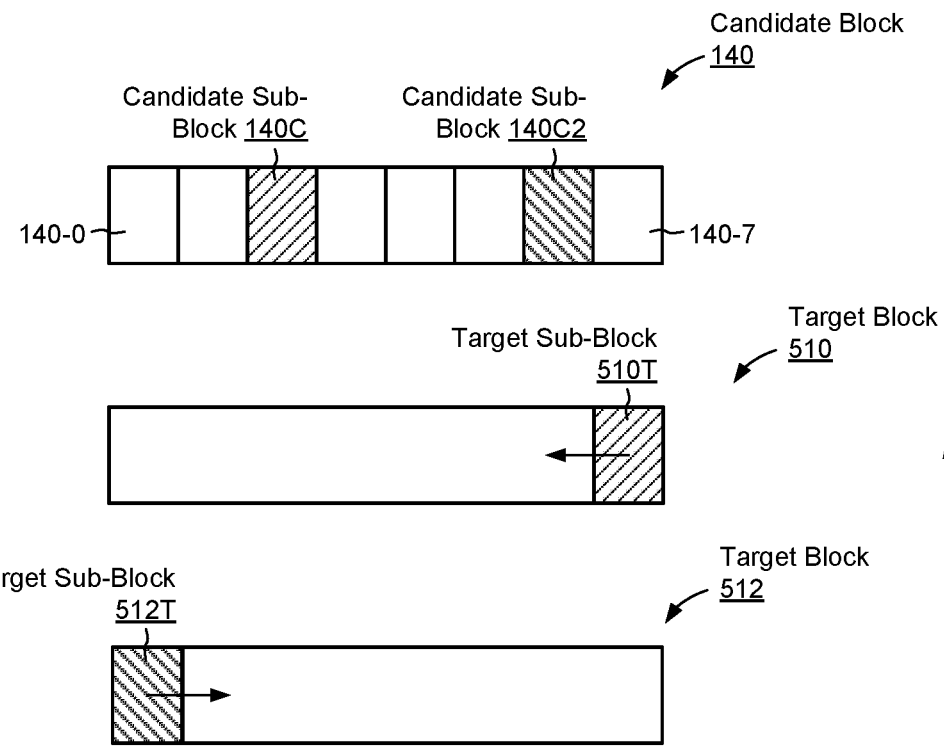
FIGS. 5A and 5B are diagrams that show an example sequence for identifying two duplicate ranges and a unique range of a candidate block when two candidate sub-blocks have matched to two different target blocks.
Figure 5B:
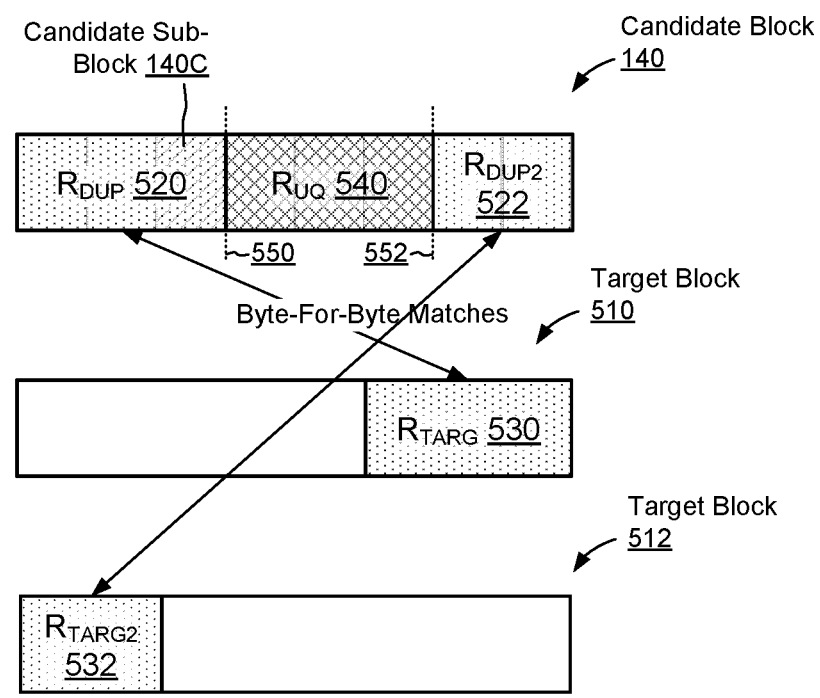

FIGS. 5A and 5B show a slightly more complex example still. As shown in FIG. 5A, two candidate sub-blocks, 140C and 140C2, of the candidate block 140 have produced respective matches to two different entries in the digest database 150. In this example, the different matches reference different target blocks 510 and 512. In particular, candidate sub-block 140C has matched target sub-block 510T, which occupies the last position in target block 510, and candidate sub-block 140C2 has matched target sub-block 512T, which occupies the first position of target block 512. As shown in FIG. 5B, the dedupe manager 132 has identified two duplicate ranges, $R_{DUP}$ 520 and $R_{DUP2}$ 522, with a single unique range $R_{UQ}$ 540 separating the two duplicate ranges. Duplicate range $R_{DUP}$ 520 matches, byte-for-byte, target range $R_{TARG}$ 530 in target block 510, and duplicate range $R_{DUP2}$ 522 matches, byte-for-byte, target range $R_{TARG}$ 532 in target block 512. Boundaries 550 and 552 separate the ranges of the candidate block 140 in the manner shown. As usual, the process stores the unique range $R_{UQ}$ 540 in a storage extent in the physical layer 180.

The presence of two duplicate ranges may necessitate the creation of additional metadata, as $BVS_C$ of the candidate block 140 must point to two different target ranges 530 and 532 in two different target blocks 510 and 512. Two insert offsets may be specified, as well, to indicate where each duplicate range is to be inserted relative to the unique range.

Figure 6A:
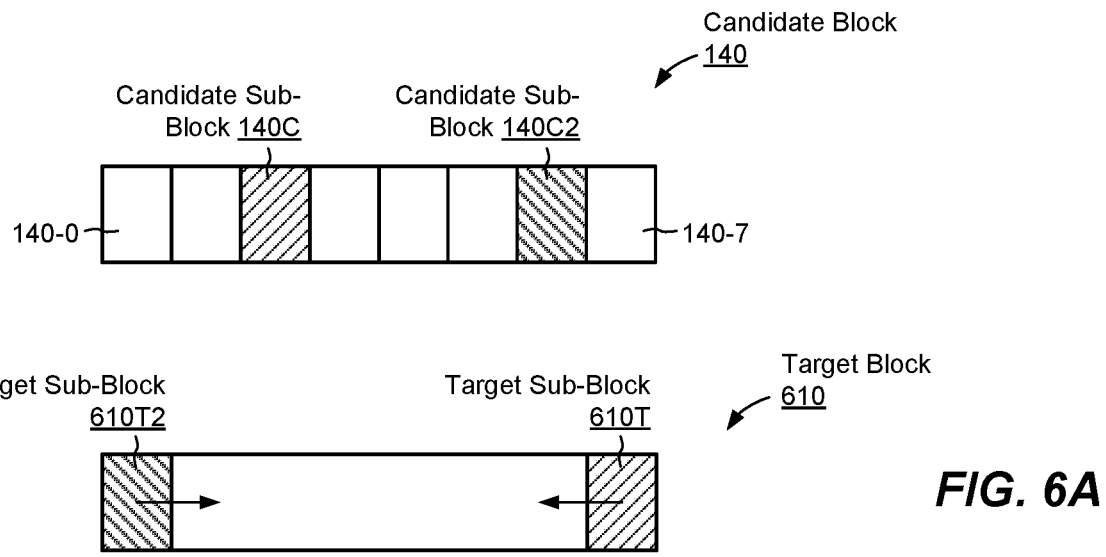
FIGS. 6A and 6B are diagrams that show an example sequence for identifying two duplicate ranges and a unique range of a candidate block when two candidate sub-blocks have matched to two distinct ranges of a single target block.
Figure 6B:
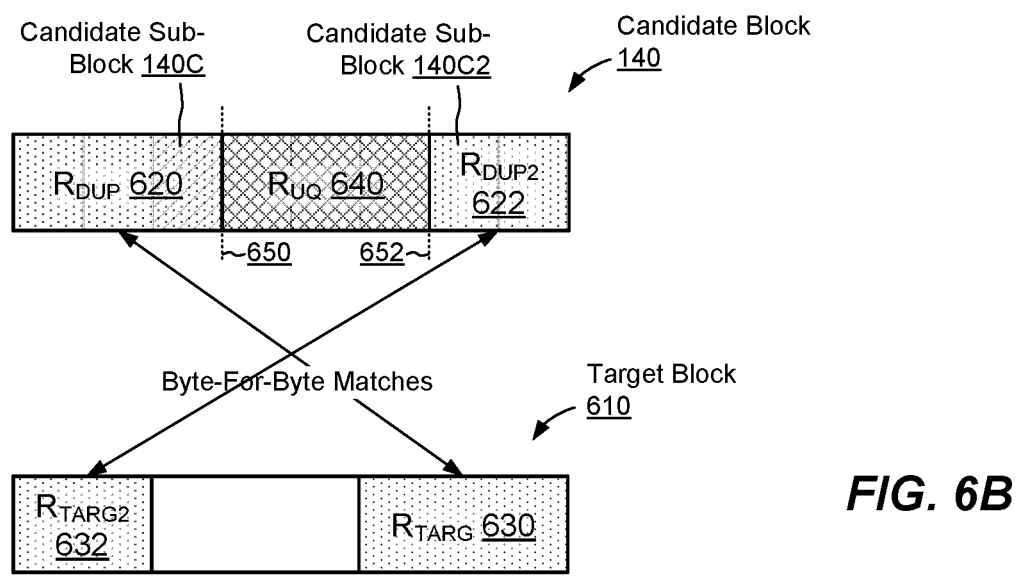

FIGS. 6A and 6B show yet another example. This example is similar to the one shown in FIGS. 5A and 5B, but here two target sub-blocks 610T and 610T2 are found within the same target block 610, rather than in two different target blocks. Candidate sub-block 140C has matched to target sub-block 610T, and candidate sub-block 140C2 has matched to target sub-block 610T2. As shown in FIG. 6B, two duplicate ranges are formed, $R_{DUP}$ 620 and $R_{DUP2}$ 622, which match, respectively, with target ranges $R_{TARG}$ 630 and $R_{TARG2}$ 632. A single unique range $R_{UQ}$ 640 is formed in the candidate block 140 between the two duplicate ranges, with boundaries 650 and 652 identified as shown. Unique range $R_{UQ}$ 640 may be stored in the usual way. $BVS_C$ of the candidate block 140 must now point to two different target ranges 630 and 632 in the target block 610, which may require two different insert offsets.

Figure 7:
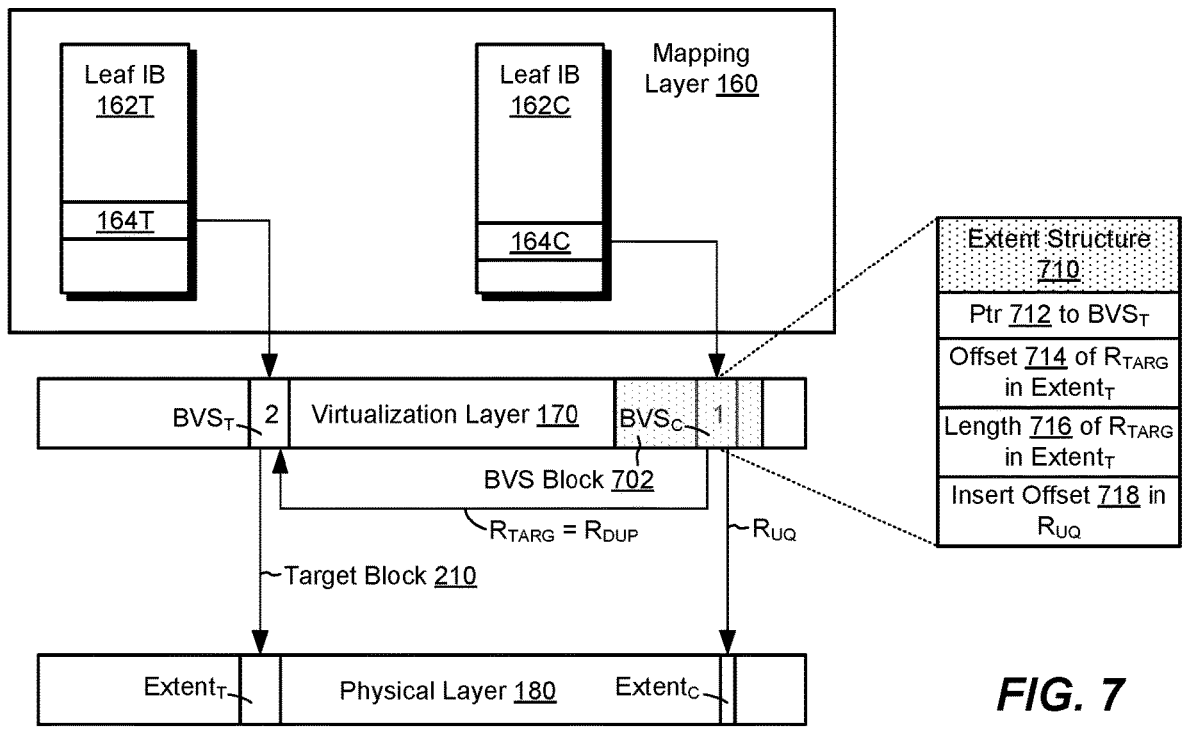
FIG. 7 is a block diagram of an example arrangement where mapping metadata is provided in a virtualization layer for supporting deduplication at sub-block granularity.

FIG. 7 shows the example metadata structures of FIG. 1 in additional detail. Here, it is seen that $BVS_C$, which is provided for mapping the candidate block 140, is located within a BVS block 702. In some examples, BVS block 702 may include a large number of BVS's. Each BVS has a reference count, which tracks the number of block pointers that point to the respective BVS. For instance, $BVS_C$ has a reference count of one, because only one block pointer, pointer 164C in leaf IB 162C, points to it. $BVS_T$, which is provided for mapping the target block 210, has a reference count of two, reflecting the fact that both block pointer 164T in leaf IB 162T and a pointer in $BVS_C$ point to it.

As shown to the right of FIG. 7, $BVS_C$ stores an extent structure 710. The extent structure 710 is metadata that references a range of data in the current block within the data of another block. For example, $BVS_C$ supports mapping for a particular logical address of a particular data object hosted by the data storage system 116, and BVS c resolves that logical address into a first pointer to the unique range $R_{UQ}$ and a second pointer to the duplicate range $R_{DUP}$. Here, the first pointer of $BVS_C$ points to $Extent_C$ and the second pointer, which is provided within the extent structure 710, points to the target range $R_{TARG}$ of the target block 210. Example metadata elements of the extent structure 710 include the following:

Pointer 712. An address of $BVS_T$, the BVS of the target block where the duplicate range resides in the virtualization layer 170.

Offset 714. Offset of the target range $R_{TARG}$ in $Extent_T$. Used for locating the starting location of $R_{TARG}$, which matches $R_{DUP}$.

Length 716. The length of the target range $R_{TARG}$ in $Extent_T$. The offset 714 and length 716 together fully identify the target range $R_{TARG}$ within $Extent_T$, which is itself fully identified by the pointer 712.

Insert Offset 718. An offset relative to the unique range $R_{UQ}$ in $Extent_C$ where the contents of the duplicate range $R_{DUP}$ are to be inserted when reconstituting the candidate block 140.

One should appreciate that an extent structure 710 is required only in cases where some of the contents that would normally be contained in an extent pointed to by a BVS have been deduplicated, such that those contents reside in a different physical extent from the one pointed to by that BVS. Thus, only some BVS's will use extent structures 710, whereas others do not. In addition, some BVS's may employ multiple extent structures 710. The examples presented in FIGS. 5A/5B and 6A/6B would each require two extent structures 710, one for identifying each of the two duplicate ranges presented in each example. Further, one should appreciate that the placement of extent structures 710 in the mapping metadata may be varied.

Figure 8:
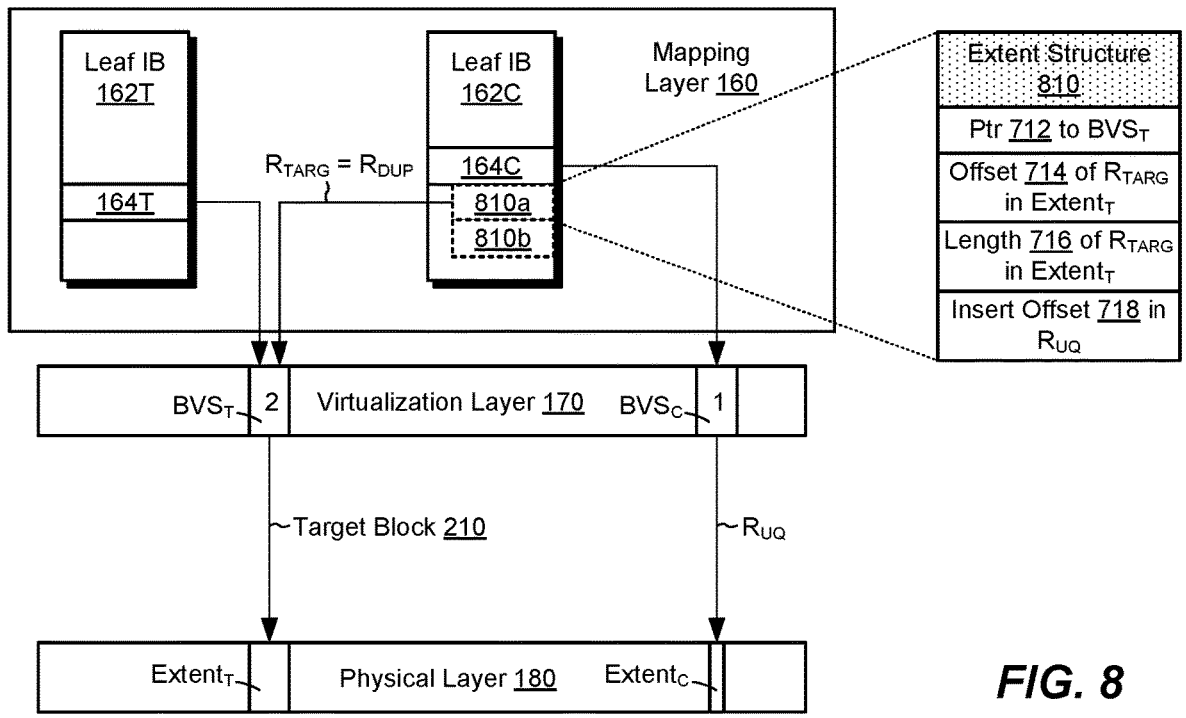
FIG. 8 is a block diagram of an example arrangement where mapping metadata is provided in a mapping layer for supporting deduplication at sub-block granularity.

FIG. 8 shows another example of an extent structure. Rather than being located in $BVS_C$, as was the case in FIG. 7, the extent structure 810 is instead located in leaf IB 162C. Placing the extent structure 810 in the leaf IB has the inherent advantage of avoiding multiple hops. In FIG. 7, for example, the SP 120 would have to access $BVS_C$, read its extent structure 710, and then access $BVS_T$. Those accesses would have to be performed in order, one after the other. By contrast, locating the extent structure 810 in the leaf IB, as shown in FIG. 8, allows the SP 120 to access both $BVS_C$ and $BVS_T$ in parallel, promoting faster processing.

Between zero and two extent structures are needed for each leaf-IB block pointer, with two extent structures shown here as structures 810a and 810b. As the leaf D3 is itself a block, which has limited space, it may be preferable in some examples to compress the contents of the leaf IB when many extent structures 810 are needed. Each leaf IB 162 includes a header and an array of block pointers. In an example, the header is marked with a label that identifies the pointers as compressed or uncompressed, and the array of block pointers (but not the header) is compressed, along with the associated extent structures 810. In this manner, ample space may be made available for any required number of extent structures 810.

Figure 9:
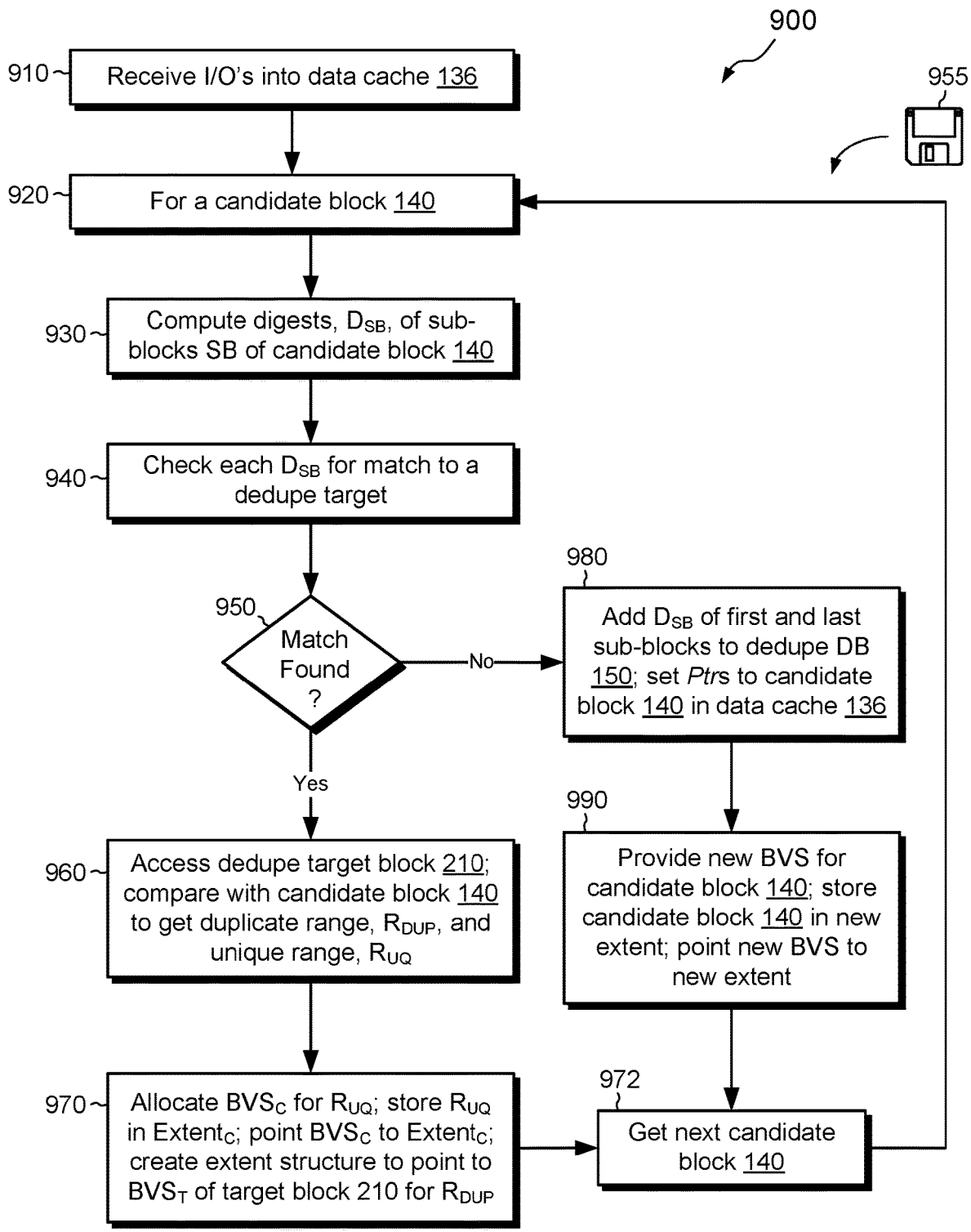
FIG. 9 is a flowchart that shows an example method of processing I/O write requests in the environment of FIG. 1.
Figure 10:
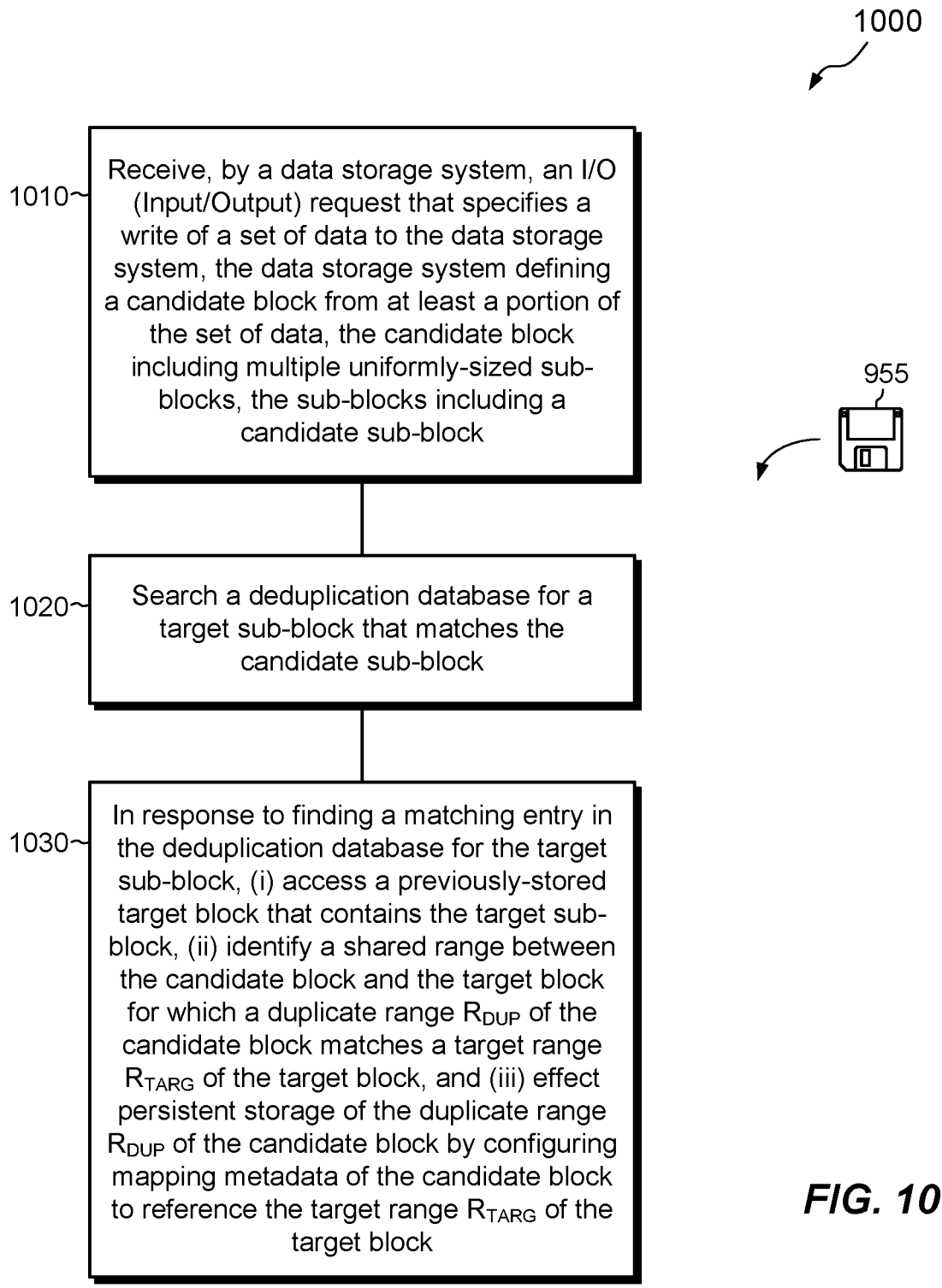
FIG. 10 is a flowchart that shows an example method of performing data deduplication in the environment of FIG. 1.

FIGS. 9 and 10 show methods 900 and 1000 that may be carried out in connection with the environment 100. The methods 900 and 1000 are typically performed, for example, by the software constructs described in connection with FIG. 1, which reside in the memory 130 of the storage processor 120 and are run by the set of processors 124. The various acts of methods 900 and 1000 may be ordered in any suitable way. Accordingly, embodiments may be constructed in which acts are performed in orders different from those illustrated, which may include performing some acts simultaneously.

FIG. 9 shows example method 900 of performing inline deduplication at sub-block granularity. At 910, the SP 120 receives sets of data specified in write I/O requests 112 into the data cache 136. The data cache 136 stores the data in block-size buffer caches (blocks). Each such block includes multiple sub-blocks such as sub-blocks 140-0 to 140-7.

At 920, the dedupe manager 132 obtains a candidate block 140 from the data cache 136 and performs various acts relating to deduplication of the candidate block 140. For example, at 930, the dedupe manager 132 computes digests of at least one, but preferably all, sub-blocks 140-1 to 140-7 of the candidate block 140. At 940, the dedupe manager 132 searches the dedupe database 150 for each computed digest.

At 950, if a match is found, operation proceeds to 960, whereupon the dedupe manager 132 accesses the target block 210 (or any of the other target blocks described above), by following the reference $Ref_T$ in the matching entry 152. The dedupe manager 132 then compares the candidate block 140 with the target block 210 and identifies the duplicate range $R_{DUP}$ of the candidate block 140, which contains the same data as the corresponding target range $R_{TARG}$ of the target block 210. The dedupe manager 132 also identifies a unique range $R_{UQ}$ of the candidate block 140.

With the duplicate range $R_{DUP}$ and the unique range $R_{UQ}$ identified, operation proceeds to 970, whereupon the SP 120 allocates $BVS_C$ for the candidate block 140, stores $R_{UQ}$ in $Extent_C$, and points $BVS_C$ to $R_{UQ}$. The SP 120 also effects storage of $R_{DUP}$ by reference, by creating an extent structure 710 (or 810) that points to range $R_{TARG}$ of the target block 210, e.g., by pointing to $BVS_T$ (via pointer 712), specifying the offset 714 and length 716 of $R_{TARG}$ in $Extent_T$, and specifying an insert offset 718 that identifies where $R_{DUP}$ is to be inserted relative to $R_{UQ}$ when reconstructing the candidate block 140. If two distinct duplicate ranges are detected, two extent structures 710 (or 810) may be created. In this manner, the data storage system 116 accounts for and can later access all the data of the candidate block 140 without having to store the duplicate range $R_{DUP}$.

At 972, a next candidate block 140 is obtained and the operation described in acts 920-970 is repeated for the new candidate block. Although candidate blocks may be processed serially, as shown, they may also be processed in parallel, e.g., with multiple threads processing respective candidate blocks simultaneously.

Returning to 950, if no match is found to any of the sub-blocks 140-1 to 140-7 of the candidate block 140, operation proceeds to 980, whereupon the dedupe manager 132 creates new entries in the dedupe database 150 for the first and last sub-blocks of the candidate block 140. Creating new entries includes establishing pointers Ptr in each new entry to the candidate block 140 in the data cache 136.

At 990, the SP 120 stores the candidate block 140, without performing deduplication, by providing a new BVS for the candidate block 140, storing the candidate block 140 in a new storage extent, and pointing the new BVS to the new storage extent. Data may be stored in compressed or uncompressed form.

FIG. 10 shows method 1000 of performing data deduplication and summarizes some of the improvements described above. At 1010, a data storage system 116 receives an I/O (Input/Output) request 112 that specifies a write of a set of data 138 to the data storage system. The data storage system 116 defines a candidate block 140 from at least a portion of the set of data 138. The candidate block includes multiple uniformly-sized sub-blocks, e.g., 140-0 to 140-7, and the sub-blocks include a candidate sub-block 140C.

At 1020, a deduplication database 150 is searched for a target sub-block that matches the candidate sub-block 140C. For example, the dedupe manager 132 computes a digest of the candidate sub-block 140C and searches the dedupe database 150 for a matching entry.

At 1030, in response to finding a matching entry 152 in the deduplication database 150 for the target sub-block (e.g., 210T, 310T, etc.), (i) accessing a previously-stored target block (e.g., 210, 310, etc.) that contains the target sub-block, (ii) identifying a shared range between the candidate block 140 and the target block for which a duplicate range $R_{DUP}$ of the candidate block matches a target range $R_{TARG}$ of the target block, and (iii) effecting persistent storage of the duplicate range $R_{DUP}$ of the candidate block 140 by configuring mapping metadata (e.g., 710, 810) of the candidate block 140 to reference the target range $R_{TARG}$ of the target block.

An improved technique has been described for performing data deduplication, which operates at sub-block granularity by searching a deduplication database 150 for a match between a candidate sub-block 140C of a candidate block 140 and a target sub-block of a previously-stored target block. When a match is found, the technique identifies a duplicate range $R_{DUP}$ shared between the candidate block and the target block and effects persistent storage of the duplicate range $R_{DUP}$ by configuring mapping metadata of the candidate block 140 so that it points to the duplicate range $R_{TARG}$ in the target block.

Having described certain embodiments, numerous alternative embodiments or variations can be made. For example, although techniques have been described for performing data deduplication inline with I/O requests 112, similar techniques can be applied when performing deduplication in the background. Background deduplication can proceed substantially as described above, except that the dedupe manager 132 obtains candidate blocks 140 from persistent storage, rather than from incoming I/O requests 112. For example, SP 120 reads a data block from persistent storage, computes digests from sub-blocks of the data block, and searches the dedupe database 150 for a match to one or more of the sub-blocks. If the search reveals a match to a previously-stored target block, the SP 120 identifies a duplicate range $R_{DUP}$ and a unique range $R_{UQ}$ of the candidate block 140, effecting storage of the duplicate range $R_{DUP}$ by configuring metadata (e.g., an extent structure 710 or 810 in a BVS or IB) to reference the corresponding range $R_{TARG}$ in the target block. Also, the SP 120 replaces the storage extent that holds the previously-stored version of the candidate block 140 with a new storage extent that stores only the unique range $R_{UQ}$ of the candidate block 140. The new storage extent may be written in place of the original one, with the residual space being freed, or the unique range $R_{UQ}$ may be written to a newly allocated storage extent in the physical layer 180, with the entirety of the extent holding the original candidate block being freed.

Also, the above description has indicated that certain structures "reference" or "point to" other structures. One should appreciate that any such reference or pointing can be direct or indirect, meaning that intervening pointing structures can also be present. Further, although referenced or pointed-to structures may be identified hereinabove as "blocks," such blocks need not be persistently-stored versions. For example, such blocks may be cached versions of data blocks, or memory-resident structures that have not yet been stored on persistent storage devices.

Further, extent structures 710 or 810 can be adapted to store additional metadata for tracking small differences between sub-blocks. For instance, a data comparison of a candidate block with a target block that extends beyond the initially-matching candidate and target sub-blocks (such as shown in FIG. 2B) may reveal small differences between adjacent sub-blocks (of candidate and target blocks) being compared, which sub-blocks are almost but not quite identical. Such differences may extend over only a small number of bytes, which could easily fit into available extra space in extent structures. Thus, additional improvements may identify such minor differences (deltas) and store them in metadata along with a pointer to their locations in the sub-block. In this manner, the dedupe match can be extended to include the nearly-matching sub-block, which becomes part of the duplicate range $R_{DUP}$ and can thus be deduplicated. During a later read, the SP 120 can reconstruct the block in the usual way and then access the delta from the metadata and insert the delta in place of the duplicate data at the indicated location, thus restoring the difference. This embodiment is expected to be useful where differences in sub-blocks arise merely from timestamps, labels, or minor edits.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 955 in FIGS. 9 and 10). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of performing data deduplication, the method comprising:

receiving, by a data storage system, an I/O (Input/Output) request that specifies a write of a set of data to the data storage system, the data storage system defining a candidate block from at least a portion of the set of data, the candidate block including multiple uniformly-sized sub-blocks, the sub-blocks including a candidate sub-block;

searching a deduplication database for a sub-block that is identical to the candidate sub-block, the deduplication database including multiple entries that relate respective sub-blocks with respective references to locations where the respective sub-blocks can be found; and in response to finding a matching entry in the deduplication database for a target sub-block that is identical to the candidate sub-block, deduplicating a portion of the candidate block by (i) accessing, based on the reference in the matching entry, a previously-stored target block that contains the target sub-block, (ii) identifying a shared range between the candidate block and the target block for which a duplicate range $R_{DUP}$ of the candidate block matches a target range $R_{TARG}$ of the target block, and (iii) effecting persistent storage of the duplicate range $R_{DUP}$ of the candidate block by configuring mapping metadata of the candidate block to reference the target range $R_{TARG}$ of the target block, wherein the data storage system processes a plurality of blocks, the plurality of blocks including the candidate block and the target block, each of the plurality of blocks including greater than two uniformly-sized sub-blocks, wherein the method further comprises limiting sub-blocks for which entries in the deduplication database are created to first and last sub-blocks of blocks in which the sub-blocks are contained, said limiting conserving memory of the data storage system, wherein the candidate sub-block is neither a first nor a last sub-block of the candidate block, and the target sub-block is one of a first or a last sub-block of the target block, the searching thereby locating the target sub-block as a match to the candidate sub-block even though the target sub-block and the candidate sub-block have different positions in their respective blocks.

2. The method of claim 1, further comprising, in response to finding the matching entry in the deduplication database for the target sub-block:

identifying a unique range $R_{UQ}$ of the candidate block that does not match any range of the target block; and persistently storing the unique range $R_{UQ}$ of the candidate block in a storage extent.

3. The method of claim 2, wherein identifying the duplicate range $R_{DUP}$ of the candidate block includes locating a boundary between the duplicate range $R_{DUP}$ and the unique range $R_{UQ}$ by comparing the candidate block with the target block in increments smaller than a sub-block.

4. The method of claim 3, wherein configuring the mapping metadata for the candidate block to reference the target range $R_{TARG}$ of the target block includes specifying, in the mapping metadata, an offset and length of the target range $R_{TARG}$ in the target block.

5. The method of claim 3, wherein searching the deduplication database includes:

computing a digest of the candidate sub-block; and searching the deduplication database for an entry that corresponds to the computed digest.

6. The method of claim 5 wherein, when computing the digest of the candidate block, the method includes:

computing a digest of each of the sub-blocks of the candidate block; and searching the deduplication database for respective entries that correspond to the computed digest of one or more of the sub-blocks.

7. The method of claim 6, wherein the sub-blocks of the candidate block consist of first through last contiguous sub-blocks, and wherein the method further comprises:

creating a new entry in the deduplication database for the first sub-block, the new entry indexed based on the digest of the first sub-block and including a reference to a location of the candidate block in the data storage system; and creating a new entry in the deduplication database for the last sub-block, the new entry for the last sub-block indexed based on the digest of the last sub-block and including a reference to the location of the candidate block in the data storage system.

8. The method of claim 5, wherein the matching entry in the deduplication database further specifies a sub-block position, the sub-block position indicating a position of the target sub-block within the target block, and wherein locating the boundary between the duplicate range $R_{DUP}$ and the unique range $R_{UQ}$ includes applying the sub-block position in selecting a direction in which to proceed when comparing the candidate block with the target block.

9. The method of claim 5, further comprising:

identifying a second unique range $R_{UQ2}$ of the candidate block that does not match any range of the target block and that is discontiguous with the unique range $R_{UQ}$ within the candidate block; and persistently storing the second unique range $R_{UQ2}$ along with the unique range $R_{UQ}$ in the storage extent.

10. The method of claim 9, further comprising configuring mapping metadata that identifies a boundary in the storage extent between the unique range $R_{UQ}$ and the second unique range $R_{UQ2}$.

11. The method of claim 5, further comprising:

identifying a second duplicate range $R_{DUP2}$ of the candidate block, the second duplicate range $R_{DUP2}$ matching a sub-block of a second target block; and effecting persistent storage of the second duplicate range $R_{DUP2}$ by configuring mapping metadata to reference the sub-block of the second target block.

12. The method of claim 5, further comprising:

identifying a second duplicate range $R_{DUP2}$ of the candidate block, the second duplicate range $R_{DUP2}$ matching a second sub-block of the target block; and effecting persistent storage of the second duplicate range $R_{DUP2}$ by configuring mapping metadata to reference the second sub-block of the target block.

13. The method of claim 5, further comprising:

providing a first block virtualization structure (BVS) for the candidate block, the first BVS including a pointer to a location in where the unique range $R_{UQ}$ of the candidate block is persistently stored; and providing a second BVS for the target block, the second BVS including a pointer to a location where the target range $R_{TARG}$ of the target block is persistently stored.

14. The method of claim 13, further comprising storing, in a metadata block that contains the first BVS, the mapping metadata that references the range $R_{TARG}$ of the target block.

15. The method of claim 13, further comprising:
providing a leaf indirect block (IB) that includes a block pointer to the first BVS; and
storing, in the leaf IB, the mapping metadata that points to the range $R_{TARG}$ of the target block.

16. The method of claim 5, wherein each of the sub-blocks has a size of one sector (512 Bytes).

17. The method of claim 16, wherein computing the digest of the candidate sub-block provides the digest as a hash value having fewer than 128 bits, and wherein, when comparing the candidate block with the target block, the method further comprises confirming that the matching entry is not a hash collision.

18. A data storage system, comprising control circuitry that includes a set of processing units coupled to memory, the control circuitry constructed and arranged to:
define, by a data storage system, multiple uniformly-sized sub-blocks of a candidate block, the sub-blocks including a candidate sub-block;
search a deduplication database for a sub-block that is identical to the candidate sub-block, the deduplication database including multiple entries that relate respective sub-blocks with respective references to locations where the respective sub-blocks can be found; and
in response to finding a matching entry in the deduplication database for a target sub-block that is identical to the candidate sub-block, deduplicate a portion of the candidate block by (i) accessing, by following a pointer stored in the matching entry, a previously-stored target block that contains the target sub-block, (ii) identifying a shared range between the candidate block and the target block for which a duplicate range $R_{DUP}$ of the candidate block matches a target range $R_{TARG}$ of the target block, and (iii) effecting persistent storage of the duplicate range $R_{DUP}$ of the candidate block by configuring mapping metadata of the candidate block to reference the target range $R_{TARG}$ of the target block,
wherein the data storage system is configured to process a plurality of blocks, including the candidate block and the target block, each of the plurality of blocks including greater than two uniformly-sized sub-blocks,
wherein the control circuitry is further constructed and arranged to limit sub-blocks for which entries in the deduplication database are created to first and last sub-blocks of blocks in which the sub-blocks are contained, said limiting conserving memory of the data storage system,
wherein the candidate sub-block is neither a first nor a last sub-block of the candidate block, and the target sub-block is one of a first or a last sub-block of the target block,
the search thereby locating the target sub-block as a match to the candidate sub-block even though the target sub-block and the candidate sub-block have different positions in their respective blocks.

19. A computer program product including a set of non-transitory, computer-readable media having instructions which, when executed by control circuitry of a data storage system, cause the control circuitry to perform a method of performing data deduplication, the method comprising:
defining, by a data storage system, multiple uniformly-sized sub-blocks of a candidate block, the sub-blocks including a candidate sub-block;
searching a deduplication database for a sub-block that is identical to the candidate sub-block, the deduplication database including multiple entries that relate respective sub-blocks with respective references to locations where the respective sub-blocks can be found; and
in response to finding a matching entry in the deduplication database for a target sub-block that is identical to the candidate sub-block, deduplicating a portion of the candidate block by (i) accessing, by following a pointer stored in the matching entry, a previously-stored target block that contains the target sub-block, (ii) identifying a shared range between the candidate block and the target block for which a duplicate range $R_{DUP}$ of the candidate block matches a target range $R_{TARG}$ of the target block, and (iii) effecting persistent storage of the duplicate range $R_{DUP}$ of the candidate block by configuring mapping metadata of the candidate block to reference the target range $R_{TARG}$ of the target block,
wherein the data storage system processes a plurality of blocks, the plurality of blocks including the candidate block and the target block, each of the plurality of blocks including greater than two uniformly-sized sub-blocks,
wherein the method further comprises limiting sub-blocks for which entries in the deduplication database are created to first and last sub-blocks of blocks in which the sub-blocks are contained, said limiting conserving memory of the data storage system,
wherein the candidate sub-block is neither a first nor a last sub-block of the candidate block, and the target sub-block is one of a first or a last sub-block of the target block,
the searching thereby locating the target sub-block as a match to the candidate sub-block even though the target sub-block and the candidate sub-block have different positions in their respective blocks.

20. The computer program product of claim 19, wherein data deduplication is performed on the duplicate range $R_{DUP}$ of the candidate block without first persistently storing the candidate block in the data storage system, such that the deduplication of the duplicate range $R_{DUP}$ is an inline deduplication.

* * * * *